US00RE40803E

(19) United States
(12) Reissued Patent
Montalvo et al.

(10) Patent Number: US RE40,803 E
(45) Date of Reissued Patent: Jun. 23, 2009

(54) COMPLEX NUMBER MULTIPLIER

(75) Inventors: Luis Montalvo, Domloup (FR); Marylin Arndt, Biviers (FR)

(73) Assignee: Fahrenheit Thermoscope LLC, Las Vegas, NV (US)

(21) Appl. No.: 11/606,325

(22) PCT Filed: Nov. 20, 2001

(86) PCT No.: PCT/FR00/01337

§ 371 (c)(1),
(2), (4) Date: May 18, 2000

(87) PCT Pub. No.: WO00/72187

PCT Pub. Date: Nov. 30, 2000

Related U.S. Patent Documents

Reissue of:
(64) Patent No.: 6,826,587
Issued: Nov. 30, 2004
Appl. No.: 09/979,283
Filed: May 18, 2000

(30) Foreign Application Priority Data

May 20, 1999 (FR) ..... 99/06425

(51) Int. Cl.
*G06F 7/52* (2006.01)

(52) U.S. Cl. ..... 708/622
(58) Field of Classification Search ..... 708/622
See application file for complete search history.

(56) References Cited

U.S. PATENT DOCUMENTS 4,344,151 A * 8/1982 White ..... 708/622
5,694,349 A * 12/1997 Pal ..... 708/622
6,122,654 A * 9/2000 Zhou et al. ..... 708/622
6,272,512 B1 * 8/2001 Golliver et al. ..... 708/622
6,307,907 B1 * 10/2001 Kim ..... 375/377
6,411,979 B1 * 6/2002 Greenberger ..... 708/622

OTHER PUBLICATIONS

Shin K–W et al: "A Complex Multipler Architecture Based on Redundant Binary Arithmetic" IEEE International Symposium on Circuits and Systems, US, New–York, NY: IEEE, 1997, pp. 1944–1947, XP000802958 ISBN: 0–7803–3584–8.*

Yun–Nan Chang et al: "High Performance Digit–Serial Complex–Number Multiplier–Accumulator" Proceedings internaional Conference on computer design. VLSI In Computers and Processors (Cat. No. 98CB36273), Proceedings International Conference on computer design. VLSI In Computers and Processors, Austin, Tx, USA, Oct. 5–7, 1998, pp. 211–213, XP00213025 1998, Los Alamitos, CA, USA, IEEE Comput. Soc, USA ISBN: 0–8186–9099–2.*

Wei B W Y et al: "A Complex–Number Multiplier Using Radix–4 Digits" Proceedings of the Symposium on Computer Arithmetic, US, Los Alamitos, IEEE Comp. Soc. Press, vol. Symp. 12, 1995, pp. 84–90, XP000548637 ISBN: 0–7803–2949–X.*

Lyu C N et al: "Redundant Binary Booth Recording*" Proceedings of the Symposium on Computer Arithmetic, US, Los Alamitos, IEEE Comp. Soc. Press, vol. Symp. 12, 1995, pp. 50–57, XP000548633 ISBN: 0–7803–2949–X.*

* cited by examiner

*Primary Examiner*—David H Malzahn

(57) ABSTRACT

The invention concerns a complex number multiplier receiving the binary number A, B, C and D complimentarily coded in pairs so as to perform the complex multiplication (A+jB)*(C+jD). A first processing stage enables to perform the operations A–B, C–D, and A+B whereof the results are binary numbers in base two with a redundant binary format, and a borrow-save coding for subtractions and carry-save coding for addition. A second processing stage converts said results into coded binary numbers in base four. A third processing stage enables to perform multiplication (A–B)C, (C–D)B and (A+B)D with a redundant binary format and a borrow-save coding. A last stage comprises two adders for working out the real part (A–B)C+(C–D)B and the imaginary part (A+B)D+(C–D)B in a redundant binary format and a borrow-save coding.

28 Claims, 5 Drawing Sheets

COMPLEX NUMBER MULTIPLIER

Figure 1:
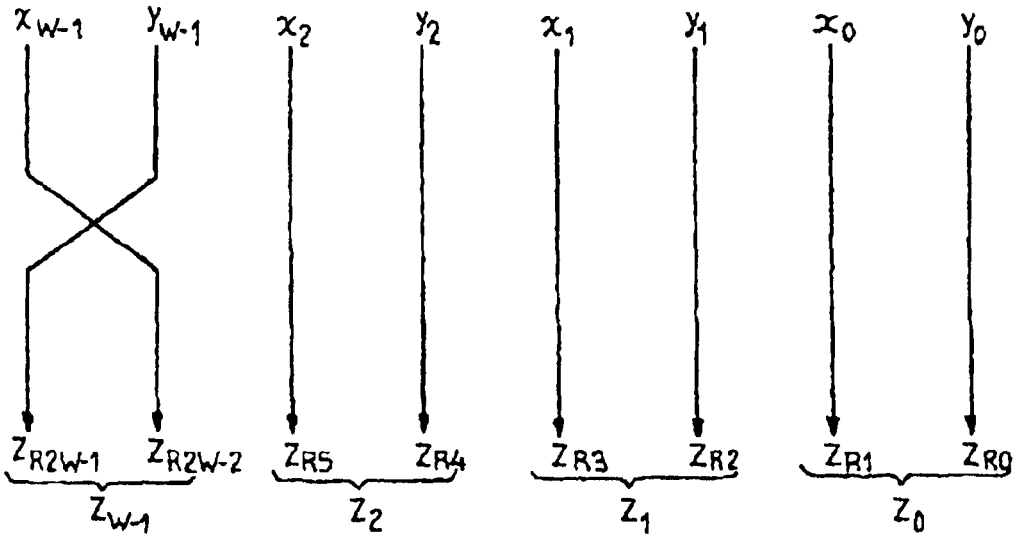

Matter enclosed in heavy brackets [ ] appears in the original patent but forms no part of this reissue specification; matter printed in italics indicates the additions made by reissue.

The present invention relates to a fast complex number multiplier which consumes little energy.

In current communication systems, the information is generally processed digitally. Digitization improves the quality and the performance of the transmission systems. Moreover, the increase in the bit rate of data transmitted and the development of ever more powerful software constrain the transmission systems to process a large amount of data in a record time, hence the importance of extremely high-performance calculation modules. One of these modules is the complex number multiplier found in practically any signal processing device such as mobile telephones, for example.

A multiplication of two complex numbers generally involves four real multiplication operations and two real addition and subtraction operations. Specifically, the multiplication of two complex numbers (A+jB) and (C+jD) can be broken down as follows:

$$(A+jB)(C+jD)=(AC-BD)+j(AD+BC)=R+jI$$

With R=AC−BD, the real part of the product and I=AD+BC, the imaginary part of the product.

This breakdown clearly involves four real multiplications (AC; BD; AD and BC) and two real additions and multiplications (AC−BD and AD+BC).

A, B, C and D are binary numbers represented according to a two's complement convention.

For a positive number, the first bit, called the "sign bit", is equal to zero, and the following bits code the absolute value of the relevant decimal number in natural binary.

For a negative number, the sing bit is equal to one, and the following bits code the absolute value of the relevant decimal number in two's complement binary.

The real multiplication operations (AC,AD,BD, and BC) are particularly complex to implement.

In the prior art, use is made of a factoring technique for reducing the number of multiplication operations in return for addition and subtraction operations. This factorization, called "transformation by reduction of force" ultimately yields three multiplication operations and five addition and subtraction operations. A difficult multiplication operation has been swapped for three new addition and subtraction operations.

$$R=AC-BD=(A-B)C+(C-D)B$$

$$I=AD+BC=(A+B)D+(C-D)B$$

The five addition and subtraction operations are A−B, A+B, C−D, (A−B)C+(C−D)B, (A+B)D+(C−D) B The three multiplication operations are (A−B)C, (A+B)D, (C−D)B The terms (A−B), (A+B) and (C−D) are called "premultiplication operations" since they are intended to feed real multipliers included in a complex number multiplier.

This method is of real benefit as regards energy consumption, since one less real multiplier is synonymous with a saving of space on the electronic circuit, hence with a decrease in energy consumption, the area used by a real multiplier generally being three times greater than that of a real adder.

However, the calculation execution time for a complex number multiplier using the transformation by reduction of force, is greater than a direct complex number multiplier performing the four multiplication operations and the two addition and subtraction operations. The complex number multiplier is consequently slower.

This speed limitation is due essentially to the propagation of the carry of the least significant bit (LSB) to the most significant bit (MSB) in the course of addition and subtraction operations.

Complex number multiplier devices are known which use the transformation by reduction of force while improving the speed of execution of calculation as compared with the direct method. Such a device has been described by B. W. Y. Wei, H. Du and H. Chen in "A Complex-Number Multiplier Using Radix-4 Digits", pages 84–90, 12$^{th}$ "Symposium of Computer Arithmetic", Bath, England, 19 to 21 Jul. 1995.

In this method, the numbers are put into a redundant binary format, having numerous advantages. For example, the bit of a base two redundant binary number can take three values: −1, 0 or 1, and enables the decimal number of value 5 to be represented, in redundant binary format, by:

$[0101]$, $[011\bar{1}]$, $[1\bar{1}1]$, $[1\bar{1}01]$ or $[10\bar{1}\bar{1}]$

A decimal number can thus be represented by five redundant binary numbers. This redundancy makes it possible to reduce the rules for adding two binary numbers by confining oneself, for each bit of the result, to considering only the two bits of like rank of the two operands. Thus, the additions and subtractions are performed without carry propagation. The execution time for such an addition or subtraction operation remains constant irrespective of the length of the operands. Moreover, this representation requires no specific device for taking account of the sign bit.

In the method proposed by Wei et al, the two's complement binary numbers A, B, C and D are delivered to the input of a first stage composed of two subtractors and an adder, then the latter generates at the output the results (A−B), (A+B) and (C−D) in a redundant binary format.

These results, also called "partial products", are represented by a specific base two coding. The modules forming the first stage and performing the three addition and subtraction operations comprise inverters only.

These result then undergo a conversion from the base two to a base four in a second stage so as to reduce the length of the binary numbers forming these results and to feed three real number multipliers in a third stage.

The final result is supplied by two real adders which, from the results of the three real multipliers, generate a real part and an imaginary part. However, this device comprises very many components, this being penalizing in terms of energy dissipation.

The invention aims to afford a solution to this problem by reducing the number of logic gates required on the complex number multiplier so as to decrease consumption.

An aim of the invention is to reduced the execution time for multiplying two complex numbers.

In a general manner, the complex number multiplier comprises an input which is followed by four processing stages. The input makes it possible to receive the real part A and the imaginary part B of a first complex number, and the real part C and the imaginary part D of a second complex number, the numbers A, B, C, D being two's complement coded binary numbers.

The first processing stage comprises subtraction means able to perform the operations A−B and C−D, the result of each subtraction being a base two binary number with a redundant binary format and a borrow-save coding, and an adder module able to perform the operation A+B, the result of this addition being a base two binary number with a redundant format and a carry-save coding.

The second processing stage comprises conversion means able to convert the numbers delivered by the first processing stage into base four coded binary numbers with a redundant format.

The third processing stage comprises multiplication means able to perform the operations (A−B)C, (C−D)B and (A+B)D, the result of these operations being base two coded numbers with a redundant format.

Finally, the fourth processing stage comprises two adders for computing the real part and the imaginary part of the product of the two input complex numbers from the numbers delivered by the third processing stage, these real and imaginary parts being to the base two according to a redundant binary format.

This implementation is achieved in accordance with the transformation by reduction of force. The latter therefore involves three multiplication operations and five addition operations. All the results from the four stages of the complex multiplier are in redundant binary format. This format makes it possible to perform the addition and subtraction operations with a carry propagation limited to one bit. Therefore, the saving in processing time obtained by using the multiplier according to the invention is noteworthy as compared, for example, with a multiplier performing the transformation by reduction of force with a two's complement binary format.

According to one mode of implementation of the invention, the subtraction means comprises two distinct modules able to perform the operations A−B and C−D. Advantageously, the subtractor module and adder module are embodied solely by wiring.

At its input, each subtraction module admits two two's complement binary numbers, then performs a transformation so as to obtain a result in redundant binary format, that is to say, two bits coding a decimal number. The type of coding used to match the two bits to the decimal number is borrow-save coding, this making it possible to perform the subtraction operations with straightforward wiring without any logic gate. The cost of producing these two blocks is practically zero. The addition operation (A+B) also results in straightforward wiring since the result is in redundant binary format with carry-save coding, this being known to the person skilled in the art. Thus, the whole of the first stage is characterized by an almost zero cost.

In a preferred embodiment, the multiplication means comprise three distinct real multipliers able to perform the operations (A−B)C, (C−D)B and (A+B)D respectively. Each multiplier advantageously comprises internal means able to perform the addition of two partial products X and Y by performing the operation $X-\overline{Y}-1$, where $\overline{Y}$ denotes the 1's complement of Y.

Specifically, the internal addition of two numbers (X+Y) is performed using the following transformation:

$$X+Y=X-(-Y)=X-(\overline{Y}+1)=(X-\overline{Y})-1$$

The internal means of the real multipliers preferably comprise an inverter for delivering the number $\overline{Y}$ and a means of wiring for performing the subtraction $X-\overline{Y}$.

According to an advantageous mode of implementation of the invention, the real multipliers and adders incorporate a borrow-save coding binary tree.

By using a fourth stage for conversion from base two to base four, it was made possible to halve the number of partial products to be added in the multipliers as compared with a conventional multiplier operating with the aid of two's complement coded binary numbers. Furthermore, the use of borrow-save coding in the multipliers according to the invention also makes it possible to halve the number of partial products to be added at the level of the internal adders, i.e. a fourfold reduction as compared with a conventional multiplier.

The type of multiplier thus described comprises a regular cellular structure and dissipates less power than a conventional multiplier.

In a variant of the complex multiplier according to the invention, the real multipliers and adders incorporate a slightly modified borrow-save coding binary tree. The modification stems from the fact that any bit pair "11", is transformed into a bit pair "00", at the input of the real multipliers and adders. This makes it possible to perform fast internal additions with frugal consumption.

Described hereinbelow, by way of wholly non limiting example and with reference to the appended drawings, is a device according to the invention.

Figure 2:
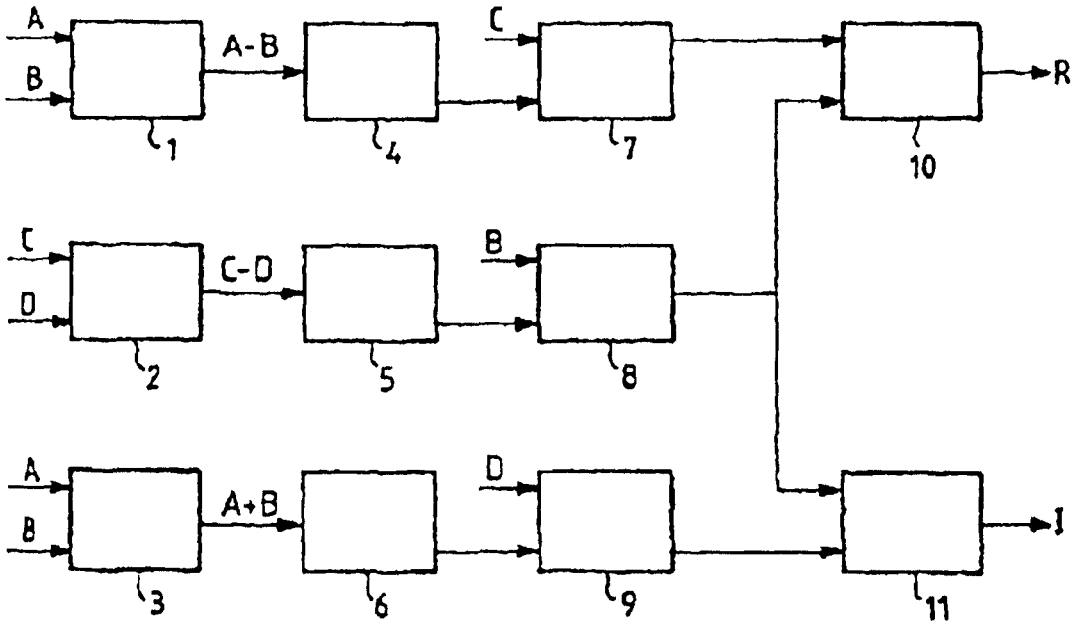
Figure 3:
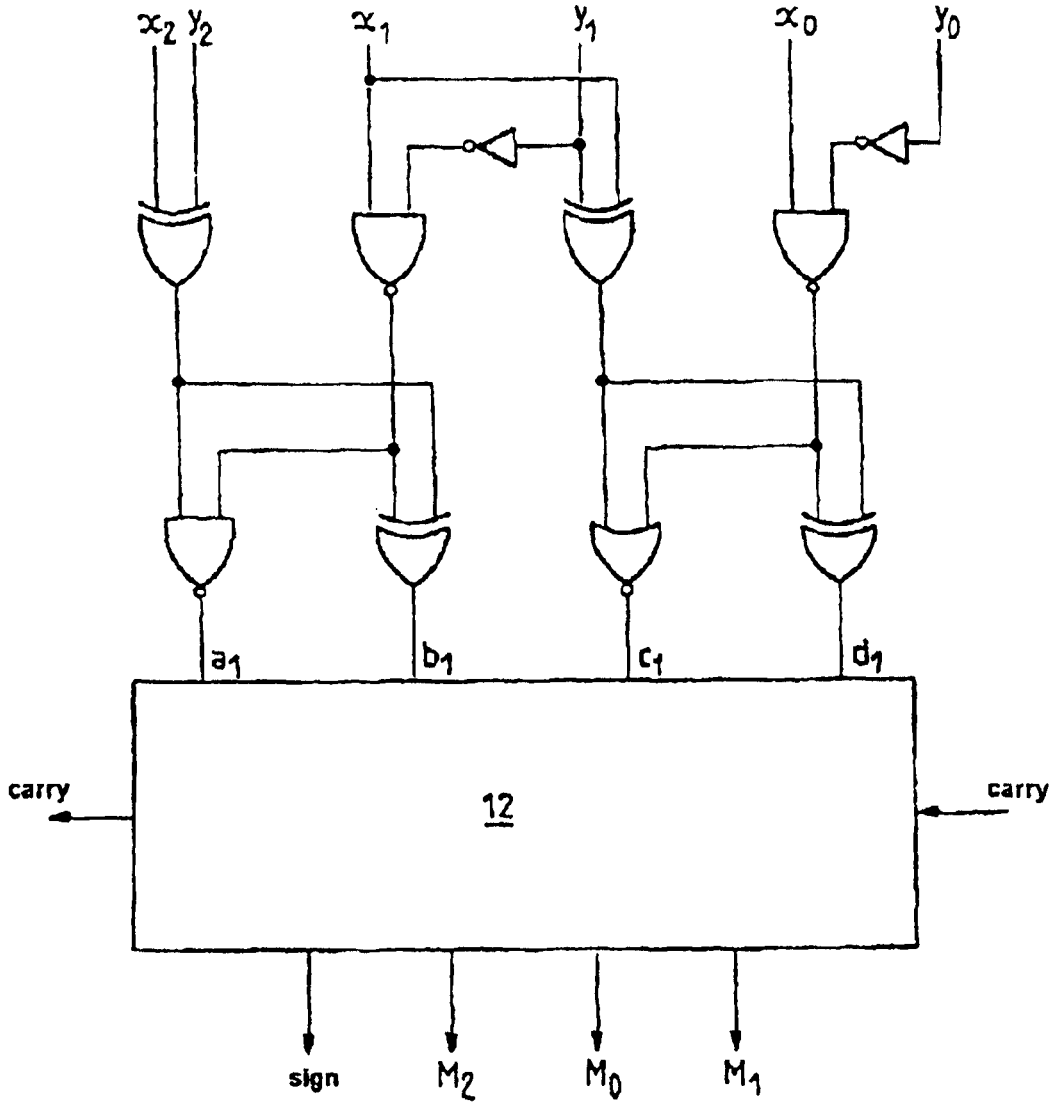
Figure 4:
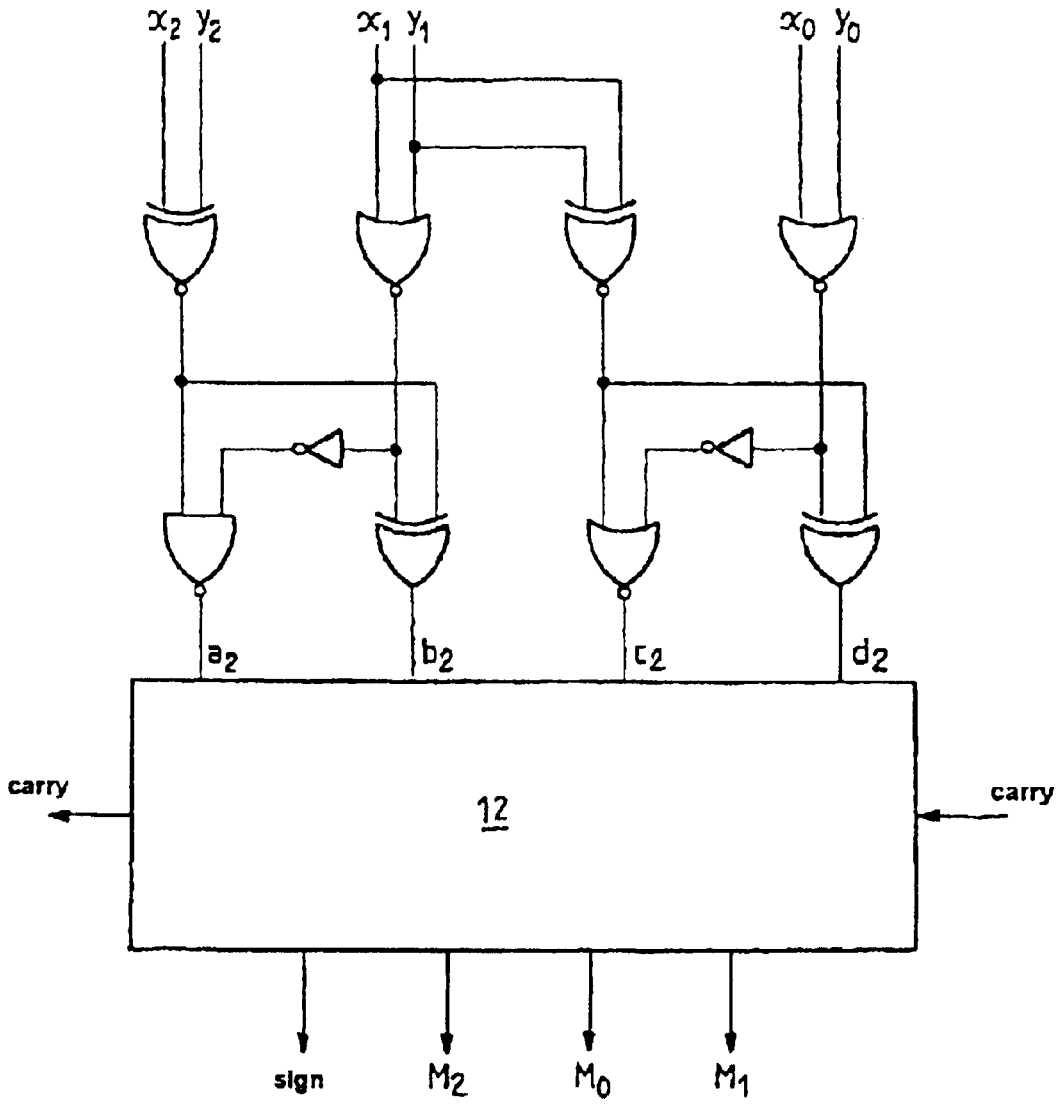
Figure 5:
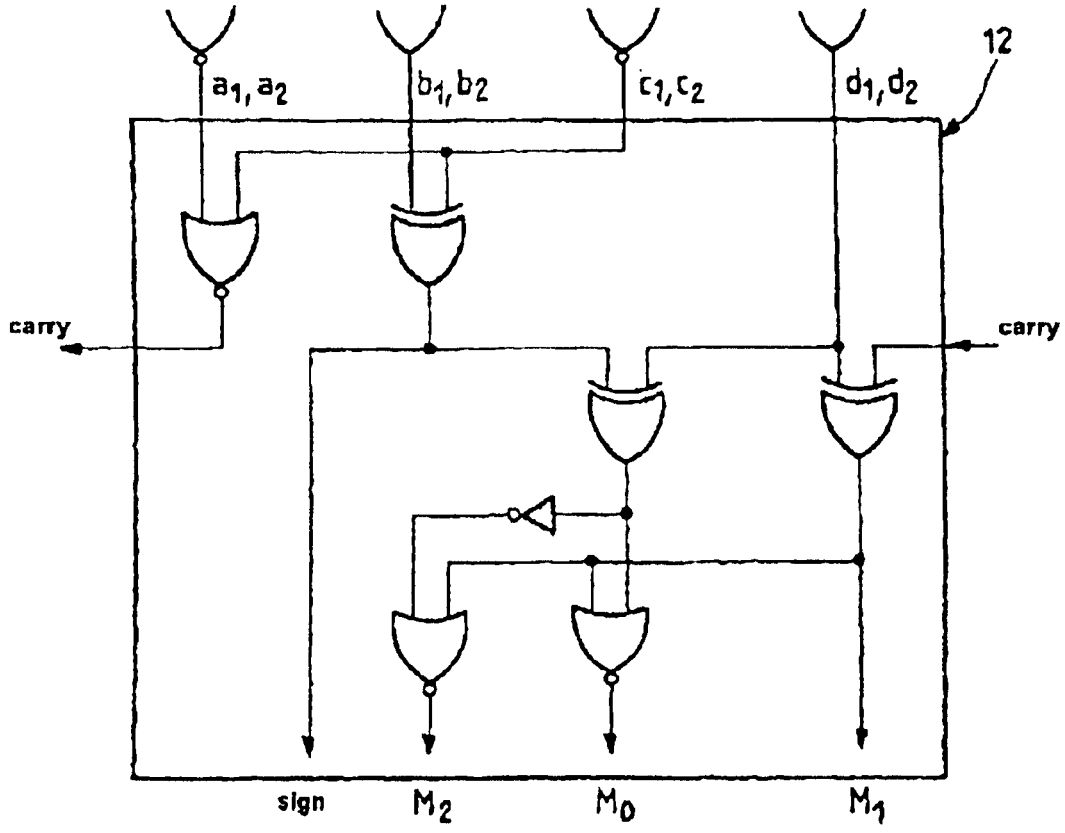
Figure 6:
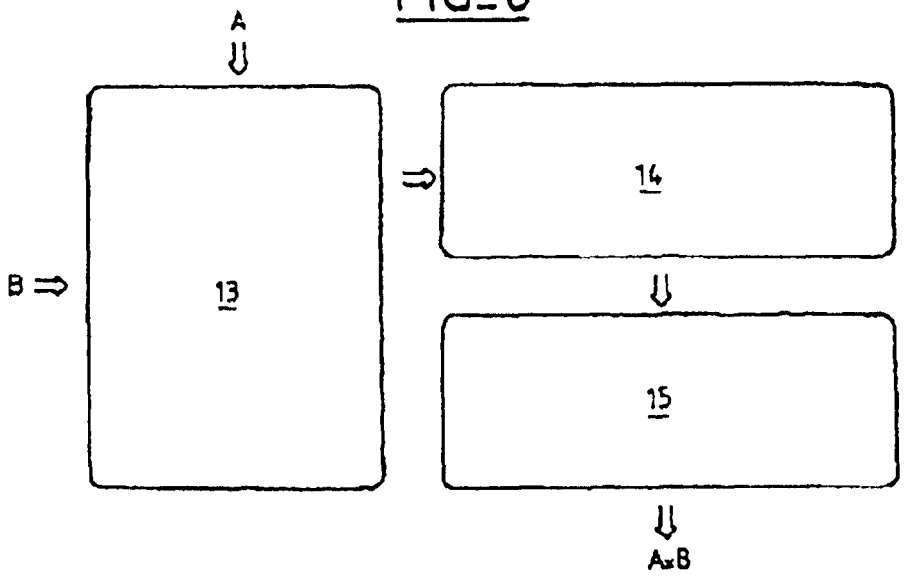
Figure 7:
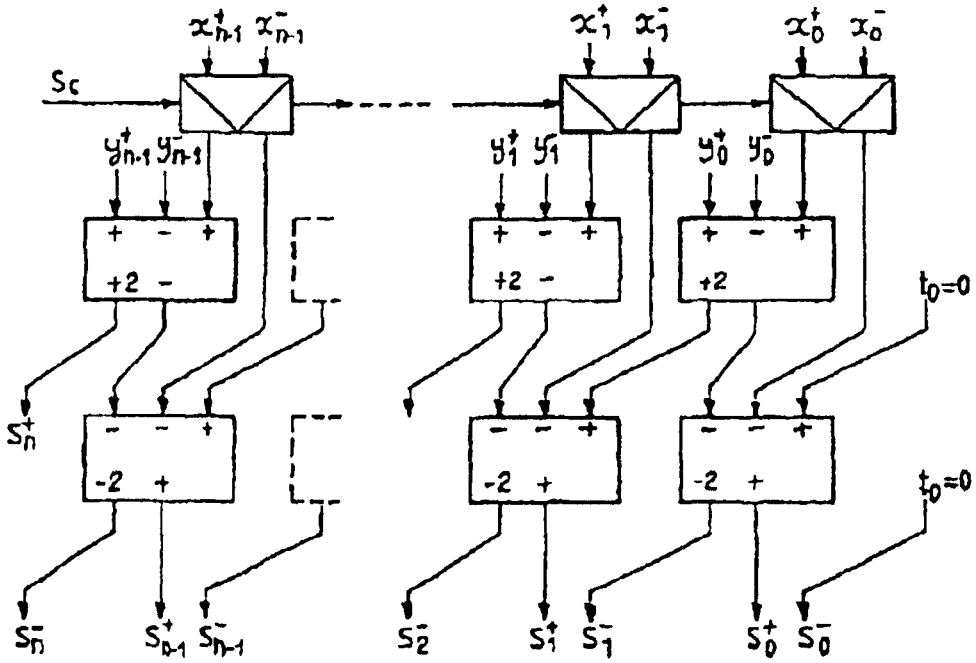

FIG. 1 illustrates the principle of subtracting two two's complement numbers; and FIG. 2 is an overall view of the complex number multiplier, FIG. 3 is a view of the borrow-save converter, FIG. 4 is a view of the carry-save converter, FIG. 5 is a view of a logic core common to both converters, borrow-save and carry-save, FIG. 6 is a view of a real multiplier of redundant numbers, FIG. 7 is a view of a real adder to redundant numbers.

As is illustrated in FIG. 1, the substation involving two binary numbers coded in two's complement X and Y, respectively characterized by the W bits $x_i$ and $y_i$, ultimately yields a result Z in singed binary format.

$$X=-x_{w-1}2^{w-1}+\Sigma_{i-0}^{w-2}x_i2^i$$

$$Y=-y_{w-1}2^{w-1}+\Sigma_{i-0}^{w-2}y_i2^i$$

$$Z=X-Y=\Sigma_{i-0}^{w-2}x_i2^i$$

The number Z comprise W bits taken from the set (−1; 0; 1).

$$z_i=\begin{cases} x_i-y_i & \text{for } 0\le i\le w-2 \\ y_i-x_i & \text{for } i=w-1 \end{cases}$$

In a practical manner, performing the operation X−Y consists in taking the W bits of X and the W bits of Y so as to form a binary number $Z_R$ of 2 W bits arranged in pairs of bits. Each bit pair of $Z_R$ consists of a first bit coming from the first operand X and of a second bit coming from the second operand Y, except for the first bit pair of index W−1 which consists of a first bit coming from the second operand Y and of a second bit coming from the first operand X:

$$Z_R=y_{w-1}x_{w-1}x_{w-2}y_{w-2}x_{w-3}y_{w-3}\ldots x_0y_0.$$

The string of multiplication operations is performed on the basis of this number $Z_R$ which is in fact merely a particular arrangement of the bits of the two operands.

After having obtained $Z_R$, it is regarded as having formed the subject of a borrow-save coding, according to the table below. The decoding of $Z_R$ is then performed according to this table and the value of Z is obtained.

| Bit pair | Signed digit |
|---|---|
| 00 | 0 |
| 01 | −1 |
| 11 | 0 |
| 10 | 1 |

By way of example, to perform the subtraction of two decimal numbers 5 and −2, one proceeds as follows:

5=0101 (coded in two's complement) $x_3\ x_2\ x_1\ x_0$

−2=1110 (coded in two's complement) $y_3\ y_2\ y_1\ y_0$

5−(−2)=7

The number $Z_R$ is then equal to:

$Z_R$=10 11 01 10 $y_3\ x_3\ x_2\ y_2\ x_1\ y_1\ x_0\ y_0$

The number Z is then equal to:

$Z=10\bar{1}1\ (y_3-x_3)\ (x_2-y_2)\ (x_1-y_1)\ (x_0-y_0)$

To obtain $Z_R$, it is sufficient to produce wiring in accordance with FIG. 1, in which only the first pair of wires is crossed.

The subtraction (X−Y) is due to three phenomena:

a) the operands are coded in two's complement b) a particular arrangement of the operands by bit pair c) a conversion of this particular arrangement into a number coded in natural binary by regarding the particular arrangement as a number coded by borrow-save (different from the two's complement). However, this step c) is performed only at the end of all the operations required for obtaining the real and imaginary parts of the final result of the complex number multiplication.

The borrow-save coding table is used to go from $Z_R$ to Z.

The binary number $Z_R$ is then a redundant binary number with borrow-save coding.

This method therefore has the advantage of performing a subtraction on the basis of two numbers coded in two's complement without comprising a single logic gate.

FIG. 2 shows an input receiving the real part A and the imaginary part B of a first complex number, and the real part C and the imaginary part D of a second complex number. The numbers A, B, C and D are binary numbers of W bits coded in two's complement.

The complex number multiplication operation is performed on four distinct stages.

The first stage makes is possible to perform the so-called premultiplication operations (A−B), (C−D) and (A+B) with the aid of three modules 1, 2 and 3. The two subtractors 1 and 2 performing the subtractions are identical to those illustrated in FIG. 1, that is to say straightforward wiring, and the results obtained A−B and C−D are two redundant binary numbers comprising 2 W bits with borrow-save coding.

The module 3 is an adder known to the person skilled in the art and makes it possible to perform the operation (A+B), so as to generate a result in redundant binary format with carry-save coding. Its implementation is likewise restricted to straightforward wiring and the result comprises 2 W bits.

The second stage comprises three conversion modules 4, 5, 6, making it possible to go from the base two of the partial products (A−B), (C−D) and (A+B) to a base four. This conversion is performed so as to reduce the number of partial products.

The numbers (A−B) and (C−D) are redundant binary numbers, of which each bit pair according to the borrow-save coding represents a signed digit included in the set (−1; 0; 1)

The number (A+B) is a redundant binary number of which each bit pair according to the carry-save coding represents a signed digit included in the set (0; 1; 2).

The modules 4 and 5 are BOOTH converters in respect of the borrow-save coding and each make it possible, from the numbers A−B and C−D, to generate a redundant binary number in base four. FIGS. 3 and 5 show this BOOTH converter with borrow-save in which the input bits are taken six by six (with an overlaid bit pair) as follows:

$$Z_R = \underbrace{y_{W-1}\,x_{W-1}\,x_{W-2}\,y_{W-2}\,x_{W-3}\,y_{W-3}\ldots x_4\,y_4\,x_3\,y_3}_{\text{Sign } M_2M_1M_0}\ \underbrace{x_2\,y_2\,x_1\,y_1}_{\text{Sign } M_2M_1M_0}\ \underbrace{x_0\,y_0.}_{\text{Sign } M_2M_1M_0}$$

The number A−B with 2 W bits in redundant binary format with borrow-save coding (base two) is introduced into the converter 4, 5 and a number A−B with 2 W-2 bits in base four redundant binary formation is obtained. FIG. 3 shows a first part consisting of a logic circuit having four outputs a1, b1, c1, d1 which feed a second part consisting of a logic circuit 12 called the logic core, represented in FIG. 5, which is identical for both converters of FIGS. 3 and 4.

The converter 4, 5 generates a redundant binary number whose bits are arranged in blocks of four, so as to represent a signed digit included in the set (−2; −1; 0; 1; 2). The four bits are such that the first is a sign bit (Sign), the following three bits, M0, M1 and M2 respectively, represent the values 0; 1 and 2.

FIG. 4 shows the converter 6 incorporating a first logic circuit with outputs a2, b2, c2, d2, and feeding the logic core 12 of FIG. 5. This converter 6 performs the same operation as the two converters 4 and 5, but with the redundant binary number with carry-save coding A+B as input.

These converters making it possible to go from a base two (−1; 0; 1) to a base four (−2; −1; 0; 1; 2) make it possible to halve the number of partial products which need to be involved in the real multiplication.

For further details, consult the publications by Messrs C. N. Lyu and D. Matula "Redundant Binary Booth Recording", pages 50–57, 12th "Symposium on computer Arithmetic", Bath, England, 19 to 21 Jul. 1995.

The third stage comprises three identical real number multipliers 7, 8 and 9.

The multiplier 7 admits the base four operand (A−B) and the two's complement coded operand C as data at the input.

The multiplier 8 admits the base four operand (C−D) and the two's complement coded operand B as data at the input.

The multiplier 9 admits the base four operand (A+B) and the two's complement coded operand D as data at the input.

These real number multipliers 7, 8 and 9 are known to the person skilled in the art, and the latter may refer, for further details, to the publication by Mr H. Makino et al, "An 8.8-ns 54*54-bit multiplier with high speed redundant binary architecture," IEEE Journal of Solid State Circuits, vol. 31, June 1996.

One of these multipliers is represented in FIG. 6. Briefly, this multiplier comprises a first generation step 13 in which partial products PP are generated. This generation step performs the operation A+B=A−B−1, this making it possible to incorporate inverters alone as logic gate. The two's complement coded operands are firstly transformed (not represented) into numbers in base four redundant binary format.

The addition of two number A+B is performed as follows:

$$A+B=A-(-B)$$

By using the two's complement representation, −B is obtained by inverting all the bits of B and by adding "1" to the least significant bit:

$$-B=\bar{B}+1$$

$$A+B=A-\bar{B}-1$$

With the borrow-save coding, subtracting "1" corresponds to adding (0, 1) which represents −1.

By using the redundant binary format, we obtain:

$$A+B=(A,\overline{B})-1=(A,\overline{B})+(0,1)$$

By way of example, the addition of A=10100110 (−90) and

B=01101101 (109) is performed as follows:

$\overline{B}$=10010010

−1=(0,1)

A + B = (1,1) (0,0) (1,0) (0,1) (0,0) (1,0) (1,1) (0,0) + (0,1) =
(0 0 1 −1 0 1 0 0) + (−1) =
32 − 16 + 4 − 1 =
19

Partial Product PP=(1,1) (0,0) (1,0) (0,1) (0,0) (1,0) (1,1) (0,0) (0,1).

The second step involves a WALLACE binary tree 14 making it possible to obtain a redundant binary number with the aid of parallel operations of addition of the partial products PP.

A third conversion step 15 makes it possible to obtain the final result with borrow-save coding.

The three multipliers 7, 8 and 9 make it possible to obtain three redundant binary numbers with borrow-save coding: (A−B)C, (C−D)B and (A+B)D The fourth stage comprises two real adders 10 and 11 able to perform the addition of two redundant binary numbers with borrow-save coding and to generate a redundant binary number with borrow-save coding. FIG. 7 shows an adder/subtracter acting in the guise of adder of two redundant binary numbers with borrow-save coding. The first stage comprises multiplexers 16–18 with a control signal Sc which is set equal to one so as to perform the addition of X and Y. To do this, the $x_i^+$ are transmitted to a second stage and the $x_i^-$ to a third stage. The second stage comprises adders 19–21 with three signed inputs and two outputs "+2" and "−" such that:

| Result of the operation | Outputs (+2;−) |
|---|---|
| 2 | 10 |
| 1 | 11 |
| 0 | 00 |
| −1 | 01 |

For example, if the operation $(y_0^+-y_0^-+x_0^+)$ of block 21 has the number two as result, then the "+2" output of block 21 will be at one, and the "−" output of block 21 will be at zero.

The blocks 22–24 are also adders such that:

| Result of the operation | Outputs (−2;+) |
|---|---|
| −2 | 10 |
| −1 | 11 |
| 0 | 00 |
| 1 | 01 |

The result of these operations is the number $S(S_n^+S_n^- \ldots S_0^{+S}{}_0^-)$ which is a redundant binary number with borrow-save coding.

The adder 10 of FIG. 2 receives the numbers (A−B)C and (C−D)B as input, and makes it possible to calculate the real part R of the complex multiplication.

The adder 11 of FIG. 2 receives the numbers (A+B)D and (C−D)B as input, and makes it possible to calculate the imaginary part I of the complex multiplication.

The complex multiplier according to the invention comprises a first stage of premultiplication operations which is embodied with straightforward wirings. The use of a redundant format with borrow-save coding and of the converters 4, 5 and 6, allows a fourfold reduction in the number of partial products to be multiplied in the real multipliers 7, 8 and 9 as compared with a complex number multiplier not using this type of coding.

By virtue in particular of the implementation of the this borrow-save coding, this device substantially reduces the energy consumption and execution time of the calculations.

This kind of multiplier generally being coupled to an accumulator, the conversion of the borrow-save coding of R and I to a conventional binary coding to the two's complement type, is performed subsequent to the accumulator so as to obtain maximum benefit from the carry nonpropagation characteristic related to the borrow-save coding during addition operations in the accumulator.

What is claimed is:

1. A complex number multiplier, comprising:

an input for receiving a real part A and an imaginary part B of a first complex number, and a real part C and an imaginary part D of a second complex number, wherein A, B, C, D are binary numbers coded in two's complement;

a first processing stage comprising a subtractor module configured to perform operations A−B and C−D, wherein results of each subtraction are a base two binary number with a redundant binary format and a borrow-save coding, and an adder module configured to perform operation A+B, wherein a result of this addition is a base two binary number with a redundant format and a carry-save coding;

a second processing stage comprising a converter configured to convert numbers delivered by the first processing stage into base four coded binary numbers with a redundant format;

a third processing stage comprising a multiplier configured to perform operations (A−B) C, (C−D)B and (A+B) D, wherein results of these operations are base two coded numbers with a redundant format; and a fourth processing stage comprising two adders configured to compute a real part and an imaginary part of a product of two input complex numbers from numbers delivered by the third processing stage, wherein the real and imaginary parts are to the base two according to a redundant binary format.

2. The complex number multiplier of claim 1, wherein the adders incorporate a borrow-save coding binary tree.

3. The complex number multiplier of claim 1, wherein the multiplier comprises three distinct real multipliers configured to perform operations (A−B)C, (C−D)B and (A+B)D respectively, and wherein each multiplier comprises internal means configured to perform an addition of two partial products X and Y by perform operation $X-\overline{Y}-1$, where $\overline{Y}$ denotes the 1's complement of Y.

4. The complex number multiplier of claim 3, wherein the real multipliers and adders incorporate a borrow-save coding binary tree.

5. The complex number multiplier of claim 3, wherein the internal means of the real multipliers comprise an inverter for delivering the number $\overline{Y}$ and a means of wiring for performing operation $X-\overline{Y}$.

6. The complex number multiplier of claim 5, wherein the real multipliers and adders incorporate a borrow-save coding binary tree.

7. The complex number multiplier of claim 1, wherein the subtractor module comprises two distinct modules configured to perform operations A−B and C−D, and wherein the subtractor module and the adder module are embodied solely by wiring.

8. The complex number multiplier of claim 7, wherein the multiplier comprises three distinct real multipliers configured to perform operations (A−B)C, (C−D)B and (A+B)D respectively, and wherein each multiplier comprises internal means configured to perform an addition to two partial products X and Y by performing operation $X-\overline{Y}-1$, where $\overline{Y}$ denotes the 1's complement of Y.

9. The complex number multiplier of claim 8, wherein the real multipliers and adders incorporate a borrow-save coding binary tree.

10. The complex number multiplier of claim 8, wherein the internal means of the real multipliers comprise an inverter for delivering the number $\overline{Y}$ and a means of wiring for performing operation $X-\overline{Y}$.

11. The complex number multiplier of claim 10, wherein the real multipliers and adders incorporate a borrow-save coding binary tree.

*12. A complex number multiplier, comprising:*

*an input for receiving a real part A and an imaginary part B of a first complex number, and a real part C and an imaginary part D of a second complex number, wherein A, B, C, D are binary numbers coded in two's complement form;*

*a first processing stage which outputs values representing operations A−B, C−D, and A+B, wherein the A−B and C−D values are each a base two binary number with a redundant binary format and a borrow-save coding, wherein the A+B value is a base two binary number with a redundant format and a carry-save coding;*

*a second processing stage comprising a converter configured to convert numbers delivered by the first processing stage into base four coded binary numbers with a redundant format;*

*a third processing stage comprising one or more multipliers configured to perform operations (A−B)C, (C−D)B and (A+B)D, wherein results of these operations are base two coded numbers with a redundant format; and*

*a fourth processing stage comprising two adders configured to compute a real part and an imaginary part of a product of two input complex numbers from numbers delivered by the third processing stage, wherein the real and imaginary parts are base two with a redundant binary format.*

*13. The complex number multiplier as recited in claim 12 wherein the A−B value output by the first processing stage comprises an arrangement of bits from A and B, and wherein the C−D value output by the first processing stage comprises an arrangement of bits from C and D, and wherein the A+B value comprises another arrangement of bits from A and B.*

*14. The complex number multiplier as recited in claim 13 wherein the A−B value comprises pairing of respective bits from respective bit positions of A and B, and wherein the C−D value comprising pairing of respective bits from respective bit positions of C and D.*

*15. The complex number multiplier as recited in claim 14 wherein the values A−B and C−D are formed in the first processing stage solely by wiring.*

*16. The complex number multiplier as recited in claim 14 wherein the pairing of respective bits is provided in a first order for a most significant bit position of A and B, and wherein the pairing of respective bits is provided in a second order for each other bit position of A and B.*

*17. The complex number multiplier as recited in claim 16 wherein the first order comprises the most significant bit of B followed by the most significant bit of A.*

*18. The complex number multiplier as recited in claim 17 wherein the second order comprises the respective bit of A followed by the respective bit of B.*

*19. The complex number multiplier as recited in claim 12 where the values A−B, C−D, and A+B are formed in the first processing stage solely by wiring.*

*20. The complex number multiplier as recited in claim 12 wherein the adders in the fourth processing stage comprise a borrow-save coding tree.*

*21. The complex number multiplier as recited in claim 12 wherein the one or more multipliers in the third processing stage comprises a borrow-save coding tree.*

*22. A mobile phone comprising a complex number multiplier comprising:*

*an input for receiving a real part A and an imaginary part B of a first complex number, and a real part C and an imaginary part D of a second complex number, wherein A, B, C, D are binary numbers coded in two's complement form;*

*a first processing stage which outputs values representing operations A−B, A+B, and C−D, wherein the A−B and C−D values are each a base two binary number with a redundant binary format and a borrow-save coding, wherein the A+B value is a base two binary number with a redundant format and a carry-save coding;*

*a second processing stage comprising a converter configured to convert numbers delivered by the first processing stage into base four coded binary numbers with a redundant format;*

*a third processing stage comprising one or more multipliers configured to perform operations (A−B)C, (C−D)B and (A+B)D, wherein results of these operations are base two coded numbers with a redundant format; and*

*a fourth processing stage comprising two adders configured to compute a real part and an imaginary part of a product of two input complex numbers from numbers delivered by the third processing stage, wherein the real and imaginary parts are base two with a redundant binary format.*

*23. The mobile phone as recited in claim 22 wherein the A−B value output by the first processing stage comprises an arrangement of bits from A and B, and wherein the C−D value output by the first processing stage comprises an arrangement of bits from C and D, and wherein the A+B value output by the first processing stage comprises another arrangement of bits from A and B.*

*24. The mobile phone as recited in claim 23 wherein the A−B value comprises pairing of respective bits from respective bit positions of A and B, and wherein the C−D value comprises pairing of respective bits from respective bit positions of C and D.*

*25. The mobile phone as recited in claim 24 wherein the values A−B and C−D are formed in the first processing stage solely by wiring.*

*26. The mobile phone as recited in claim 22 wherein the values A+B, A−B, and C−D are formed in the first processing stage solely by wiring.*

*27. The mobile phone as recited in claim 22 wherein the adders in the fourth processing stage comprise a borrow-save coding tree.*

*28. The mobile phone as recited in claim 22 wherein the one or more multipliers in the third processing stage comprise a borrow-save coding tree.*

* * * * *